(12) United States Patent
Ashraf et al.

(10) Patent No.: US 10,300,948 B2
(45) Date of Patent: May 28, 2019

(54) WEBBING DEVICES FOR AN UNDERBODY OF A MOTOR VEHICLE

(71) Applicant: Faraday&Future Inc., Gardena, CA (US)

(72) Inventors: Umran Ashraf, San Diego, CA (US); Rene Johan Veltman, Torrance, CA (US); Cory Denis Borghi, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 151 days.

(21) Appl. No.: 15/078,871

(22) Filed: Mar. 23, 2016

(65) Prior Publication Data

US 2017/0120951 A1     May 4, 2017

Related U.S. Application Data

(60) Provisional application No. 62/248,959, filed on Oct. 30, 2015.

(51) Int. Cl.
| | |
|---|---|
| *B62D 21/03* | (2006.01) |
| *B60K 1/04* | (2019.01) |
| *B62D 21/07* | (2006.01) |
| *B62D 21/10* | (2006.01) |
| *B62D 27/02* | (2006.01) |
| *B62D 25/02* | (2006.01) |
| *B62D 29/00* | (2006.01) |

(Continued)

(52) U.S. Cl.
CPC ............ *B62D 21/03* (2013.01); *B60K 1/04* (2013.01); *B62D 21/07* (2013.01); *B62D 21/10* (2013.01); *B62D 27/023* (2013.01); *B60K 2001/001* (2013.01); *B60K 2001/0438* (2013.01); *B62D 25/025* (2013.01); *B62D 29/008* (2013.01); *B62D 63/025* (2013.01)

(58) Field of Classification Search
CPC ...... B62D 21/03; B62D 21/07; B62D 27/023; B62D 27/02
USPC ....................................... 296/29, 30
See application file for complete search history.

(56) References Cited

U.S. PATENT DOCUMENTS

| | | |
|---|---|---|
| 3,869,017 A | 3/1975 | Feustel et al. |
| 4,173,264 A | 11/1979 | Erker et al. |
| 5,042,831 A | 8/1991 | Kuhns |

(Continued)

FOREIGN PATENT DOCUMENTS

| | | |
|---|---|---|
| JP | 2007-283868 A | 11/2007 |
| JP | 2012-166673 A | 9/2012 |

(Continued)

OTHER PUBLICATIONS

Final Office Action dated Aug. 25, 2017, for U.S. Appl. No. 14/840,741, filed Aug. 31, 2015, ten pages.

(Continued)

*Primary Examiner* — Joseph D. Pape
(74) *Attorney, Agent, or Firm* — Morrison & Foerster LLP

(57) ABSTRACT

A webbing device for a vehicle underbody can comprise a plurality of rows of ribs and members that extend between the ribs to provide rigidity and force load distribution. The webbing device can comprise channels to receive a variety of structural components of the underbody and can accommodate underbodies of various sizes without altering its rigidity and force load distribution.

7 Claims, 16 Drawing Sheets

(51) Int. Cl.
*B62D 63/02* (2006.01)
*B60K 1/00* (2006.01)

(56) References Cited

U.S. PATENT DOCUMENTS

| | | |
|---|---|---|
| 5,476,151 A | 12/1995 | Tsuchida et al. |
| 6,227,322 B1 | 5/2001 | Nishikawa |
| 6,793,248 B1 | 9/2004 | Sung |
| 6,843,524 B2 | 1/2005 | Kitagawa |
| 7,258,392 B2 | 8/2007 | Frederick et al. |
| 7,393,016 B2 | 7/2008 | Mitsui et al. |
| 8,051,934 B2 | 11/2011 | Kiya et al. |
| 8,424,960 B2 | 4/2013 | Rawlinson et al. |
| 8,459,726 B2 | 6/2013 | Tyan et al. |
| 8,490,988 B2 | 7/2013 | Takeshita et al. |
| 8,530,015 B2 * | 9/2013 | Mendiboure ........ B62D 29/002 296/187.02 |
| 8,657,060 B2 | 2/2014 | Ohno et al. |
| 8,672,354 B2 | 3/2014 | Kim et al. |
| 8,696,051 B2 | 4/2014 | Charbonneau et al. |
| 8,789,634 B2 | 7/2014 | Nitawaki |
| 8,807,632 B2 | 8/2014 | Ramoutar et al. |
| 8,882,150 B2 | 11/2014 | Yamada et al. |
| 9,067,550 B2 | 6/2015 | Nagwanshi et al. |
| 9,073,578 B2 | 7/2015 | Chikazawa |
| 9,096,275 B2 | 8/2015 | Yasui et al. |
| 9,120,507 B1 | 9/2015 | Alwan et al. |
| 9,168,883 B1 | 10/2015 | Midoun et al. |
| 9,187,053 B2 | 11/2015 | Nusier et al. |
| 9,187,136 B1 | 11/2015 | Leanza et al. |
| 9,254,872 B2 | 2/2016 | Otani et al. |
| 9,272,679 B1 | 3/2016 | Ramoutar et al. |
| 9,346,424 B2 | 5/2016 | Alavandi et al. |
| 2002/0057004 A1 | 5/2002 | Corcoran et al. |
| 2006/0061081 A1 | 3/2006 | Kresse, Jr. et al. |
| 2006/0103169 A1 * | 5/2006 | Anders ............. B62D 25/2027 296/193.01 |
| 2007/0215402 A1 | 9/2007 | Sasaki et al. |
| 2009/0243336 A1 | 10/2009 | Honji et al. |
| 2010/0147608 A1 | 6/2010 | Okabe |
| 2011/0015902 A1 | 1/2011 | Cheng et al. |
| 2011/0062750 A1 | 3/2011 | Nakaura et al. |
| 2012/0169089 A1 | 7/2012 | Rawlinson et al. |
| 2012/0175897 A1 | 7/2012 | Rawlinson et al. |
| 2013/0069377 A1 | 3/2013 | Qu et al. |
| 2013/0088044 A1 | 4/2013 | Charbonneau et al. |
| 2013/0200653 A1 | 8/2013 | Yasui et al. |
| 2013/0241237 A1 | 9/2013 | Dziuba et al. |
| 2014/0291053 A1 | 10/2014 | Nagasawa et al. |
| 2014/0338999 A1 | 11/2014 | Fujii et al. |
| 2015/0353040 A1 | 12/2015 | Butukuri et al. |
| 2015/0375622 A1 | 12/2015 | Yamanaka |
| 2016/0039467 A1 | 2/2016 | Takenaka |
| 2016/0207418 A1 | 7/2016 | Bergstrom et al. |
| 2017/0001507 A1 | 1/2017 | Ashraf et al. |
| 2017/0001586 A1 | 1/2017 | Ashraf et al. |
| 2017/0001667 A1 | 1/2017 | Ashraf |
| 2017/0025655 A1 | 1/2017 | Klimek et al. |

FOREIGN PATENT DOCUMENTS

| | | |
|---|---|---|
| JP | 2013-117291 A | 6/2013 |
| WO | WO-2012/117204 A1 | 9/2012 |
| WO | WO-2017/136351 A2 | 8/2017 |

OTHER PUBLICATIONS

Non-Final Office Action dated Feb. 1, 2018, for U.S. Appl. No. 15/015,034, filed Feb. 3, 2016, 7 pages.
Non-Final Office Action dated Mar. 16, 2018, for U.S. Appl. No. 15/240,976, filed Aug. 18, 2016, seven pages.
Final Office Action dated May 5, 2017, for U.S. Appl. No. 15/240,976, filed Aug. 18, 2016, eight pages.
First Action Interview Office Action Summary dated Feb. 6, 2017, for U.S. Appl. No. 15/240,976, filed Aug. 18, 2016, three pages.
International Search Report dated Apr. 24, 2017, for PCT Application No. PCT/US2016/059564, filed Oct. 28, 2016, eight pages.
Non-Final Office Action dated Feb. 9, 2017, for U.S. Appl. No. 14/840,741, filed Aug. 31, 2015, 13 pages.
First Action Interview Pilot Program Pre-Interview Communication dated Nov. 10, 2016, for U.S. Appl. No. 15/240,976, filed Aug. 18, 2016, seven pages.
International Search Report and Written Opinion dated Mar. 18, 2016 in PCT Application No. PCT/US2015/064506, filed Dec. 8, 2015.
International Search Report dated May 16, 2017, for PCT Application No. PCT/US2017/015857, filed Jan. 31, 2017, three pages.
Final Office Action dated May 21, 2018, for U.S. Appl. No. 14/840,741, filed Aug. 31, 2015, eleven pages.
Notice of Allowance dated Jun. 13, 2018, for U.S. Appl. No. 15/015,034, filed Feb. 3, 2016, five pages.
Notice of Allowance dated Jul. 12, 2018, for U.S. Appl. No. 15/240,976, filed Aug. 18, 2016, five pages.

* cited by examiner

WEBBING DEVICES FOR AN UNDERBODY OF A MOTOR VEHICLE

CROSS-REFERENCE TO RELATED APPLICATIONS

The present application claims the benefit of U.S. Provisional Application No. 62/248,959, filed on Oct. 30, 2015, the entire disclosure of which is hereby incorporated by reference for all purposes.

FIELD OF THE DISCLOSURE

The present disclosure relates generally to an automobile frame and, more particularly, but not by way of limitation, to an underbody frame and design for electric and other motor vehicles.

BACKGROUND

Vehicles such as cars, vans, trucks and buses can be constructed on a supporting structure known as a frame, chassis or underbody. In a body-on-frame design, the frame is separate from the body of the vehicle and components of the vehicle such as the engine, drivetrain and body are coupled to the frame. In contrast, the body and frame are at least partially integrated with one another in uni-body construction. The frame can comprise a plurality of rails, beams, tubes and other structural members coupled together to form a load bearing structure.

SUMMARY

The present disclosure can be directed to webbing devices for a vehicle. An exemplary device can comprise a body panel formed so as to have a recess. The body panel can comprise an end rail channel, a cross member channel, and a center frame section channel. Webbing can be disposed within the recess. The webbing can be formed from rows of ribs and members that extend between the ribs to form cells. The webbing can provide structural integrity, crumple resistance, and force load distribution.

According to additional exemplary embodiments, the present disclosure can be directed to an underbody for a vehicle. An exemplary underbody can comprise a frame and four webbing members. The frame can comprise a plurality of front end rails and a plurality of rear end rails, a front end cross member and a rear end cross member, and a left center frame section and a right center frame section. A first of the four webbing members can be associated with one of the plurality of front end rails, the front end cross member, and the right center frame section. A second of the four webbing members can be associated with one of the plurality of front end rails, the front end cross member, and the left center frame section. A third of the four webbing members can be associated with one of the plurality of rear end rails, the rear end cross member, and the right center frame section. A fourth of the four webbing members can be associated with one of the plurality of rear end rails, the rear end cross member, and the left center frame section.

According to further exemplary embodiments, the present disclosure can be directed to a connector for a vehicle underbody. An exemplary connector can comprise a formed, single-piece body panel. The body panel can comprise a center frame section channel, a cross member channel oriented essentially perpendicular to the center frame section channel, and an end rail channel oriented essentially parallel and non-collinear to the center frame section channel. A recess can be formed in the body panel and webbing can be disposed within the recess. The webbing can be formed from rows of ribs and members that extend between the ribs to form cells. The webbing can provide structural rigidity, crumple resistance, and force load distribution. The body panel can provide a transition from a central underbody section to an end underbody section.

BRIEF DESCRIPTION OF THE DRAWINGS

Certain embodiments of the present disclosure are illustrated by the accompanying figures. It will be understood that the figures are not necessarily to scale and that details not necessary for an understanding of the technology, or that render other details difficult to perceive, may be omitted. It will be understood that the technology is not necessarily limited to the particular embodiments illustrated herein.

DETAILED DESCRIPTION

Figure 1:
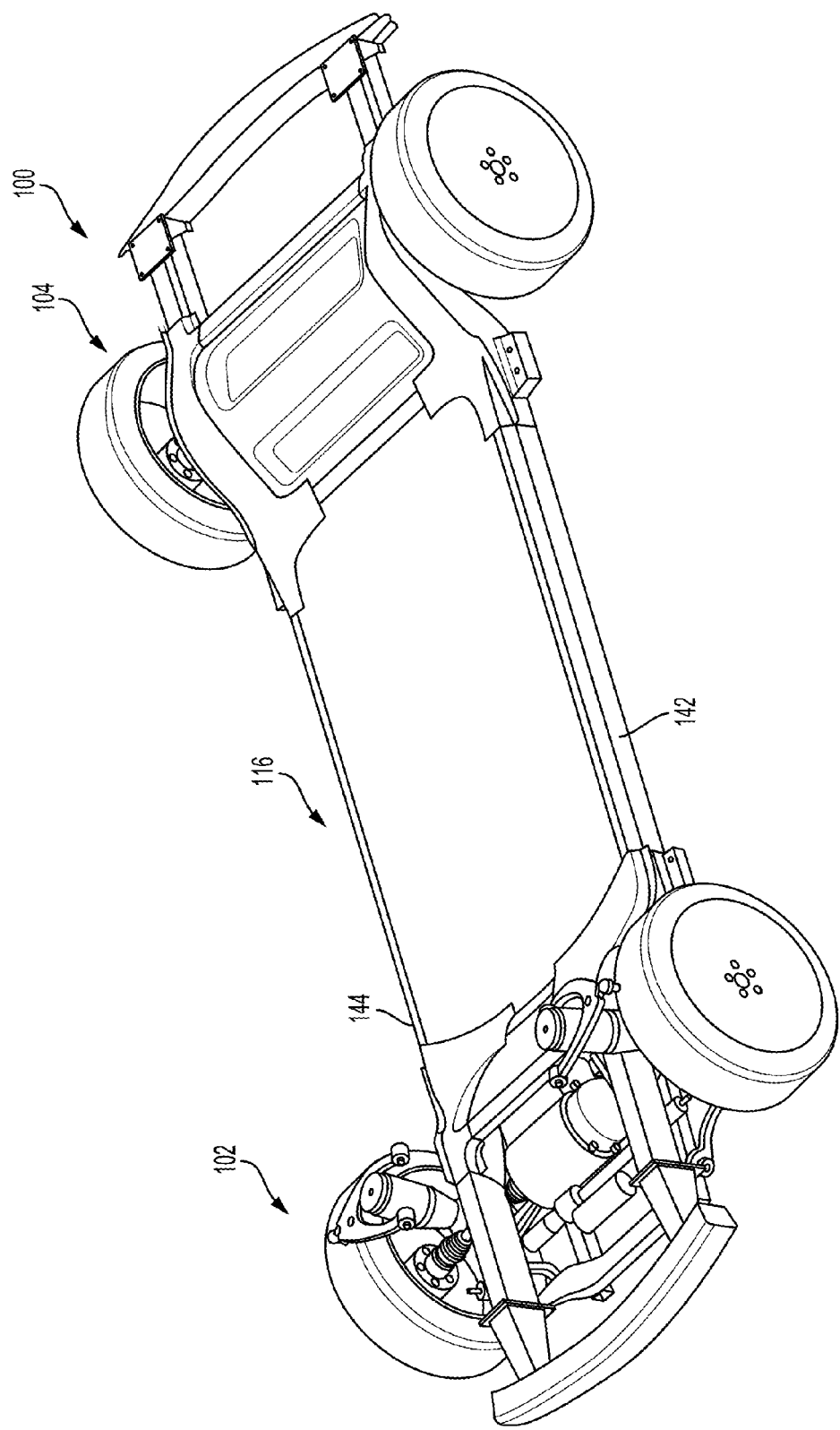
FIG. 1 is a perspective view of an underbody structure for the present disclosure according to an exemplary embodiment.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The present disclosure provides exemplary underbody structures for motor vehicles. The underbody structure is also referred to as an underbody, a skateboard, or a chassis herein. In various embodiments, the underbody can form a hybrid uni-body with the upper body of the motor vehicle. Exemplary underbodies can provide an adaptable platform for accommodating different motor vehicle sizes and different vehicle upperbodies. The underbody of the present disclosure can enhance overall vehicle safety, for example, by having the battery pack centralized in the vehicle in various embodiments, resulting in greater crumple zone performance around the battery pack compared to existing vehicle designs. In addition, various embodiments of the underbody can, for example, provide for scalability to readily adapt to new vehicle platforms and provide for improved vehicle handling (yaw acceleration).

Provided are various embodiments of an underbody for a motor vehicle. The motor vehicle can be an electric vehicle, however, the present disclosure is not limited to use in electric vehicles. In various embodiments, the underbody can be configured to form a hybrid uni-body with the upper body and/or configured for use in multiple vehicle product lines, accommodating vehicles of various sizes having various upper bodies.

In some embodiments, a length of the adaptable platform can vary by increasing or reducing the length of certain structures between the front rails and the rear rails of the underbody.

In some embodiments, the width of the adaptable platform can vary by increasing or reducing the width of certain structures between the left side and right side that meets with an upper body of the vehicle.

The size of the battery can be selectively modifiable by virtue of a modular battery design.

The underbody can enhance overall vehicle safety, for example, due to having the battery being centralized in the vehicle, allowing for greater crumple zones around the battery compared to existing vehicle designs.

An upper portion (e.g., cover) of the battery enclosure can form all or part of a floor portion (assembly) of a passenger compartment of the motor vehicle. In some embodiments, the floor portion can be separate from the upper portion. An exemplary floor portion can extend longitudinally between a front section and a rear section of the battery cover. In some embodiments, an additional plate or panel can be included in the underbody that can separately, or together with the upper portion, form the floor portion of the passenger compartment. Additional cross members may be included to provide additional structural support.

Since the underbody according to various embodiments can function as the floor portion of the passenger compartment, the passenger compartment is not required to be completely separated from the underbody.

Other example embodiments of the disclosure and aspects will become apparent from the following description taken in conjunction with the following drawings.

Figure 2:
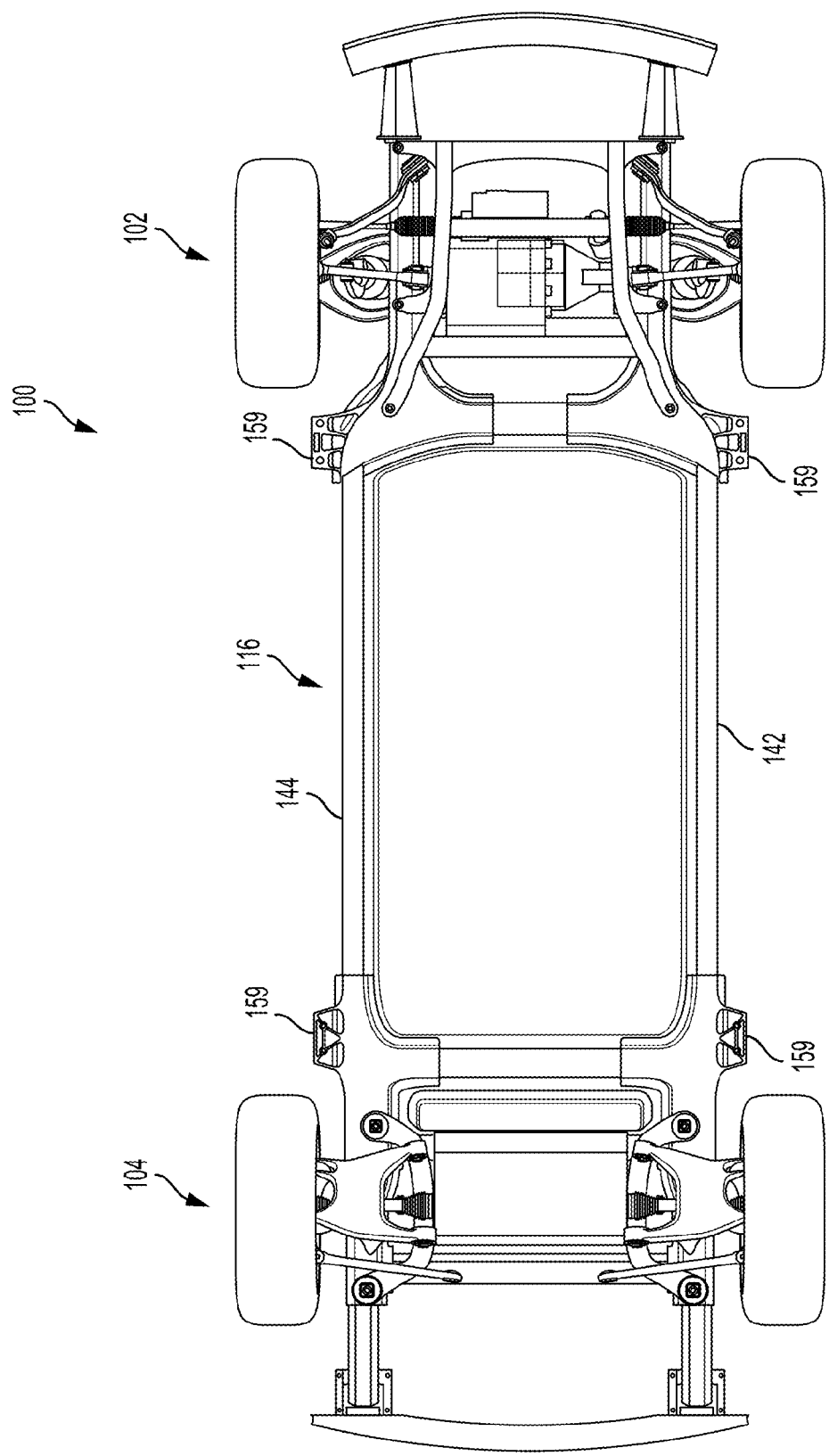
FIG. 2 is a top plan view of the underbody structure of FIG. 1.

FIGS. 1 and 2, collectively illustrate an example underbody 100. FIG. 1 is a perspective view of the example underbody 100 that is constructed in accordance with the present disclosure. Generally, the underbody 100 can include a front end 102, a rear end 104, a battery sub-assembly 106 (see FIG. 3), as well as other additional or fewer components as will be described in greater detail herein.

The front end 102 and rear end 104 can be spaced apart from one another by a middle section 116. The middle section 116 can include a left center frame section 142 and a right center frame section 144.

The underbody 100, in some embodiments, can be constructed from various materials or a single material. The material(s) utilized in the underbody 100 will be described with reference to each of the components or sub-assemblies of the underbody 100.

In general, the underbody 100 can be configured to cooperate with an upper body, as will be described in greater detail below. A common design for vehicles involves the use of body-on-frame technology, where a frame is coupled with the engine, drivetrain, portions of the vehicle's suspension system, and wheels of the vehicle. The remaining portions of the vehicle, referred to as the upper body, are joined to the frame. Safety, comfort, and aesthetic components of the vehicle are found in the upper body, such as seats. Having the seats mounted to the frame can increase the safety of the vehicle by providing the seats with a more substantial and connected relationship with the underbody of the vehicle. Indirect mechanical connections between the seat, the body, and ultimately the frame serve to reduce these features.

Also, in a traditional body-on-frame vehicle, the frame comprises a skeleton of tubular frame members, where the drivetrain (e.g., drive shaft) traverses/extends the length of the frame, which necessitates having a frame that is typically divided into a right handed section and a left handed section. These sections are then joined through the use of cross members.

Advantageously, the present disclosure provides an underbody 100 with a middle portion 116 that can be continuous from a right hand side of a frame to a left hand side of the frame, which can increase a resistance of the underbody 100 to twisting during impact.

Thus, the underbody designs of the present disclosure can benefit from the strength and stability of the monocoque (i.e., vehicle structure in which the chassis is integral with the body) design, but provide greater flexibility by allowing various body components to be placed onto the underbody 100, such as the outer panels of the upper body.

Figure 3:
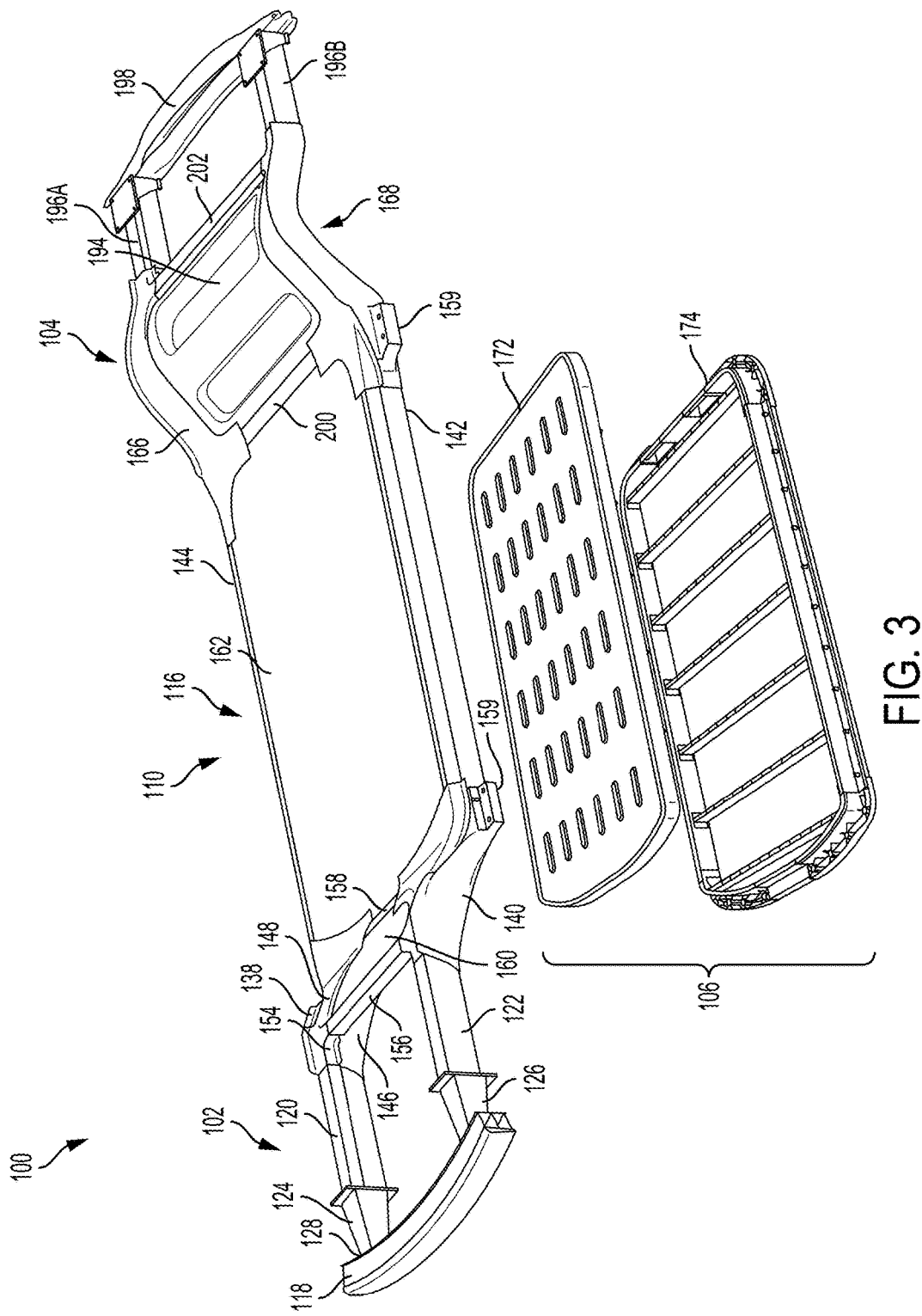
FIG. 3 is an exploded perspective view of the underbody structure, in combination with a battery sub-assembly.
Figure 9A:
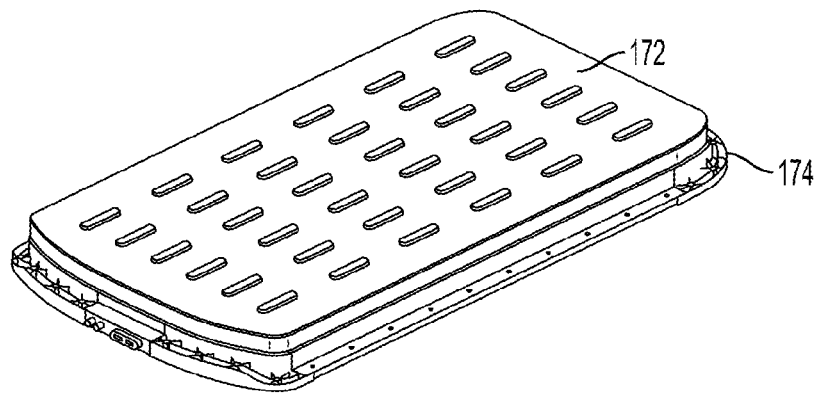
FIG. 9A is a perspective view of an exemplary battery sub-assembly.
Figure 9B:
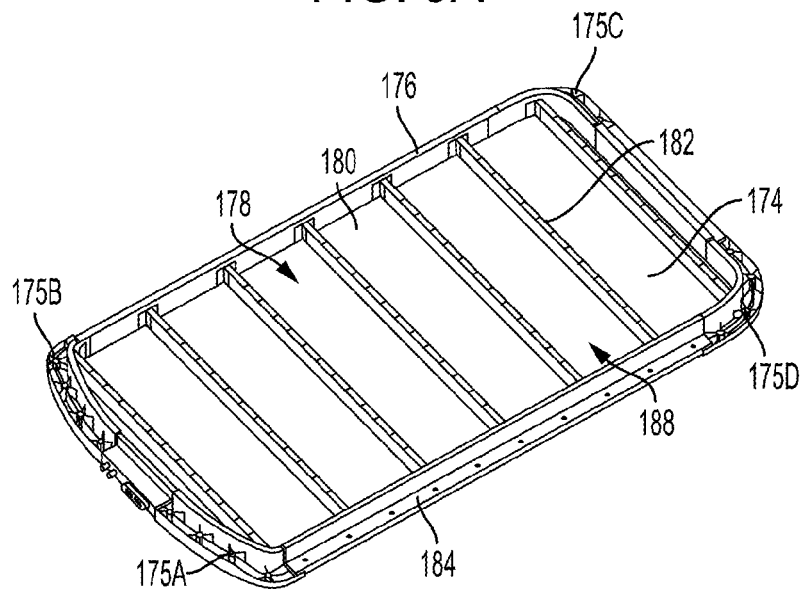
FIG. 9B is a perspective view of a body of the exemplary battery sub-assembly.
Figure 9C:
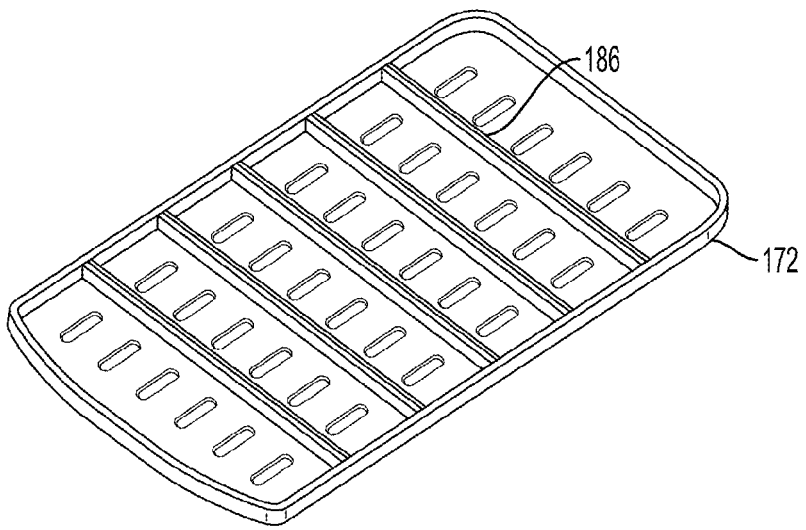
FIG. 9C is a perspective view of a cover of the exemplary battery sub-assembly.
Figure 10:
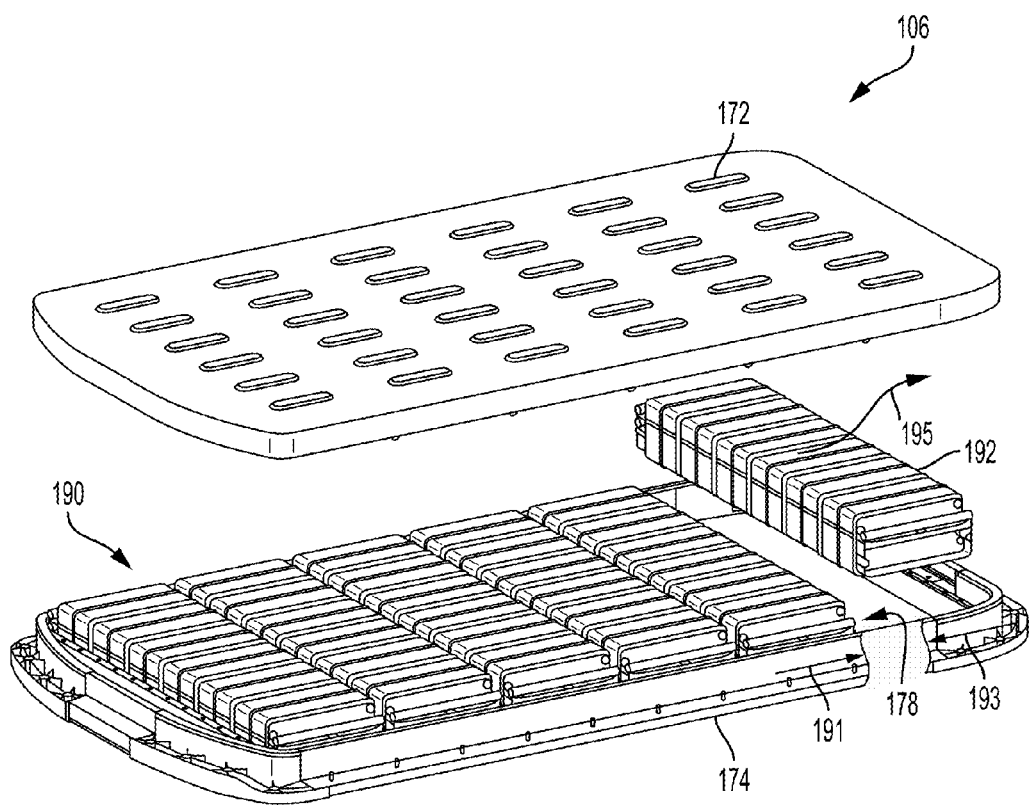
FIG. 10 is an exploded perspective view of the exemplary battery sub-assembly.

FIG. 3 is an exploded view of the underbody 100 that includes an outer peripheral frame 110 that illustrates a battery cover 172 and a body 174 (see FIGS. 9A-C) that holds the battery pack (see 190 in FIG. 10).

Figure 4:
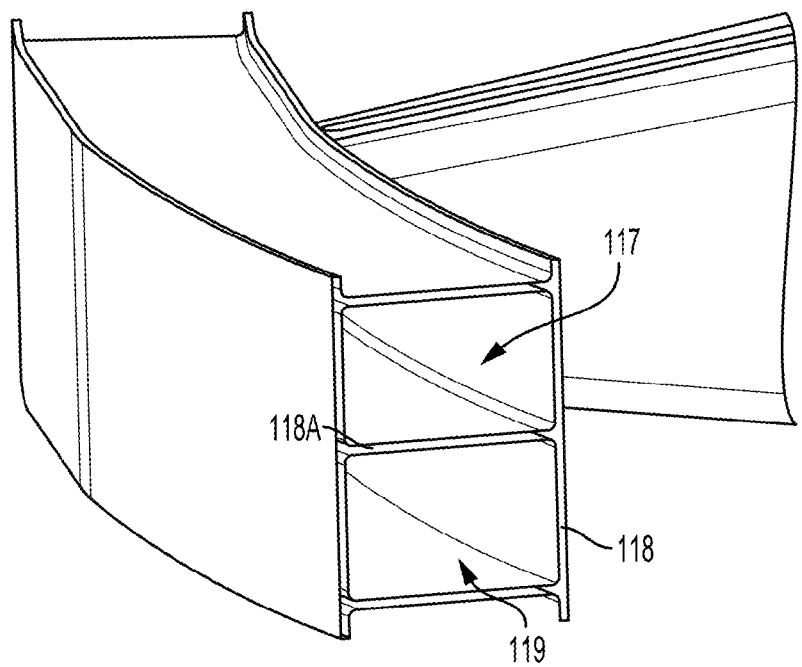
FIG. 4 is a cross sectional view of a front bumper of the underbody structure.

Turning now to FIGS. 3-6 collectively, described from front end 102 to rear end 104, the underbody 100 can comprise a front bumper 118. The front bumper 118 can be constructed from a cold rolled metal such as aluminum or an aluminum alloy in some embodiments, but any structurally strong material could be used including steel, titanium, composite materials, thermoplastic polymers, carbon fiber, and other structural materials known in the art. As illustrated in FIG. 4, the front bumper 118 can comprise a divider web 118A that separates the front bumper 118 into two sections, an upper section 117 and a lower section 119. The front bumper 118 can have a substantially tubular cross sectional area. In one embodiment, the front bumper 118 can have a substantially arcuate shape.

The front bumper 118 can be coupled with a pair of rails, such as first rail 120 and second rail 122. Connecting the front bumper 118 with the pair of rails can be the first crush can 124 and the second crush can 126.

Each of the rail crush cans 124 and 126 can be constructed similarly to one another and can be constructed from a sheet metal such as aluminum. In some embodiments, the crush cans 124, 126 can be made by casting or hydroforming. In one embodiment the first rail crush can 124 can have a substantially conical shape with flat outer face panel sections. Terminating one end of the first rail crush can 124 can be a mounting plate 128 that has an arcuate shape that conforms to an arcuate curvature of the front bumper 118. Again, the second rail crush can 126 can be constructed to form a complimentary mount for the second rail 122. It should be understood that other suitable mechanisms for coupling the front bumper 118 with the rails 120, 122 can also be adopted in other embodiments.

Figure 5:
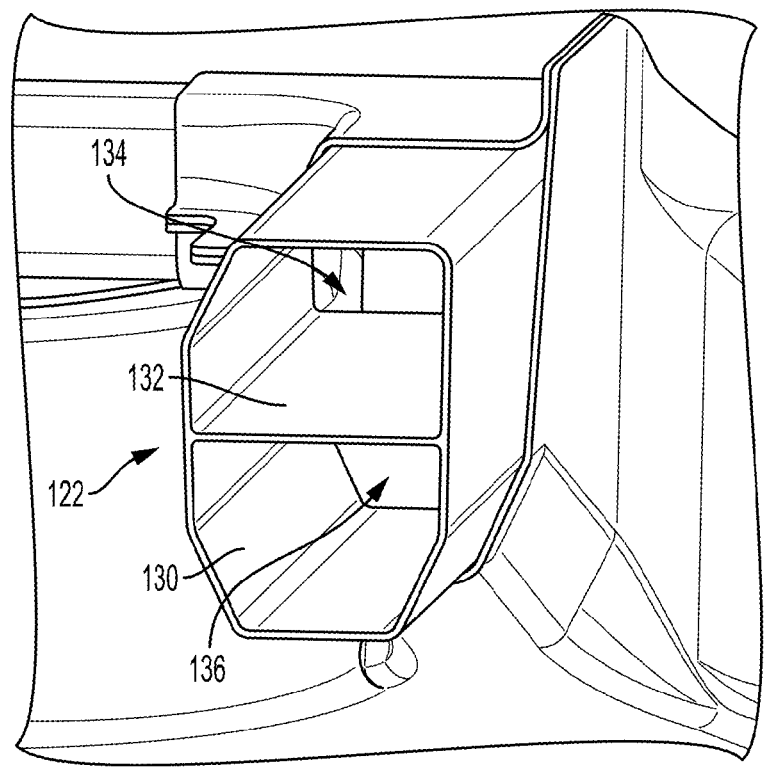
FIG. 5 is a cross sectional view of a front end rail of the underbody structure.

The first rail 120 and second rail 122 can be constructed similarly (e.g., as mirror images of each other) to one another and thus the second rail 122 will be described in greater detail with reference to FIG. 5. The second rail 122 can be a substantially tubular length of an extruded metal such as aluminum. The second rail 122 can have various angled surfaces, such as angled surface 130, which can be altered according to design requirements such as desired crumple strength and motor sizing, for example. The second rail 122 can have a divider web 132 that provides structural support and divides the second rail 122 into an upper section 134 and lower section 136.

The underbody 100 can comprise frame transition sections, such as first transition section 138 and second transition section 140. The first and second transition sections 138 and 140 can be complementary (e.g., right handed, left handed) components. The first and second transition sections 138 and 140 can provide a narrowing connection between the left center frame section 142 and the right center frame section 144 (also illustrated in FIGS. 1 and 2).

For brevity and clarity, only the first transition section 138 will be described in detail. The first transition section 138 can comprise a lower segment 146 and an upper segment 148. The lower segment 146 can be manufactured from a high pressure die cast metal, such as aluminum. The lower segment 146 can be a high strength component that provides a compression point upon which the first and second rails 120 and 122 can crumple against.

Figure 6:
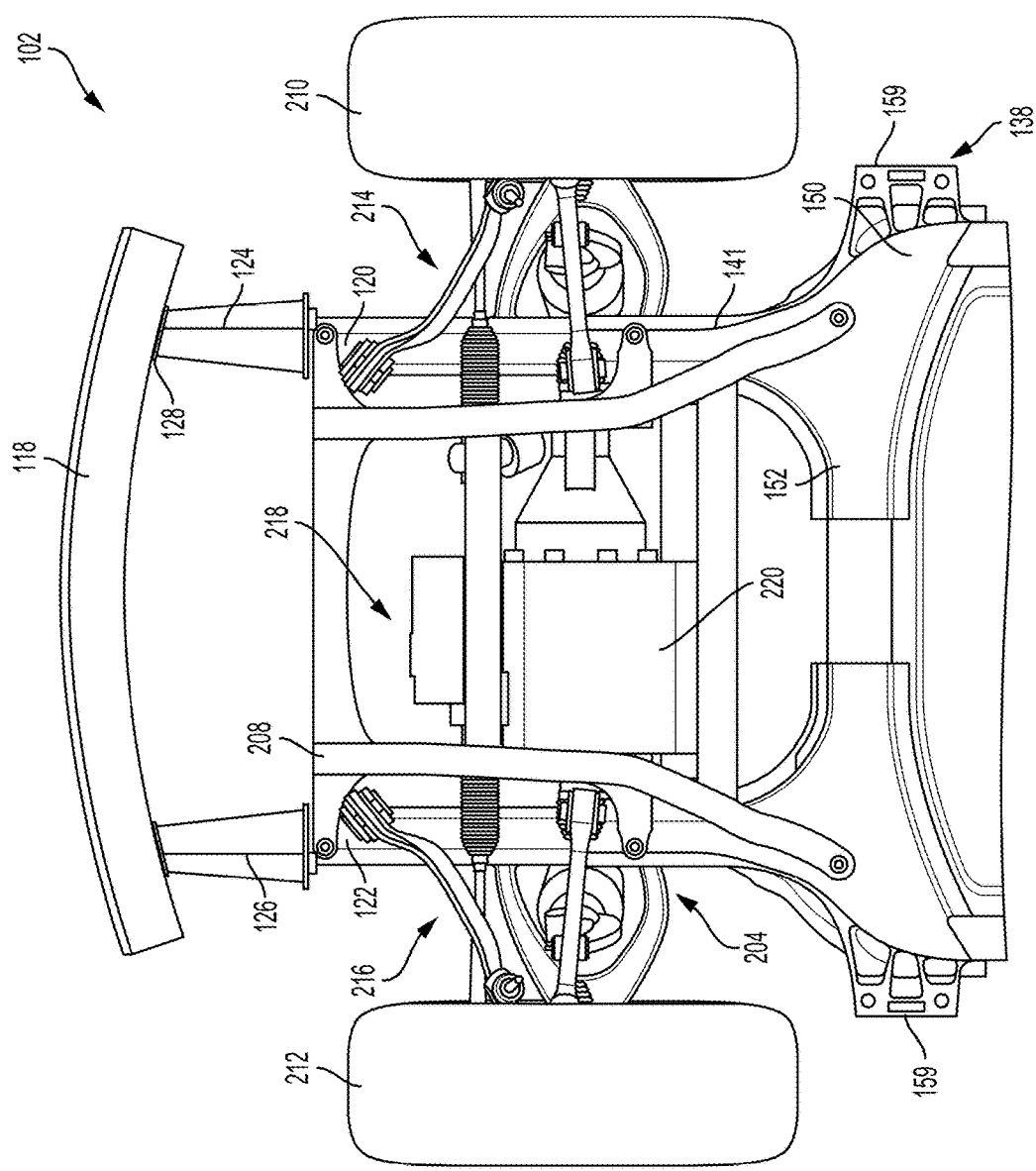
FIG. 6 is a bottom view of a front end of the underbody structure.

As illustrated in FIG. 6, the first transition section 138 can have a substantially T-shaped configuration with a rail coupling portion 141 and a frame section coupling portion 150. A transition tie section 152 can provide a mounting position for a front cross member, which is described below. Again, the second transition section 140 can have a similar, but complementary shape to first transition section 138.

In FIG. 3, the upper segment 148 of the first transition section 138 can cooperate with the lower segment 146 and include an opening 154 that receives a first front cross member 156 that ties the first transition section 138 and the second transition section 140 together, providing structural rigidity and stability to the underbody 100. The transition sections of the underbody 100 may be referred to as frame nodes. These frame nodes can provide structural rigidity and anchoring for the rails of the underbody 100.

A second front cross member 158 can extend between the first transition section 138 and the second transition section 140 for additional structural support. The upper segment 148 can include one or more sections and be configured to receive a front panel 160 that extends between the first transition section 138 and the second transition section 140 and the first and second front cross members 156 and 158. The front panel 160 can be manufactured from structurally rigid foam such as aluminum foam sandwich material.

The left center frame section 142 and the right center frame section 144 can extend between the front end 102 and the rear end 104. Extending between the left center frame section 142 and the right center frame section 144 can be a middle panel 162. The middle panel 162 may be manufactured from a structurally rigid foam such as aluminum foam sandwich material. The vehicle's passenger compartment is not required to be completely separated from the underbody 100 according to various embodiments. For instance, the cover 172 of the battery sub-assembly 106 can be the middle panel 162, such that the cover 172 can form a floor section extending longitudinally along the middle section 116. In other embodiments, the cover 172 of the battery sub-assembly 106 can be coupled, from below, to a separate middle panel 162, the combination forming a floor section of the vehicle.

Figure 7:
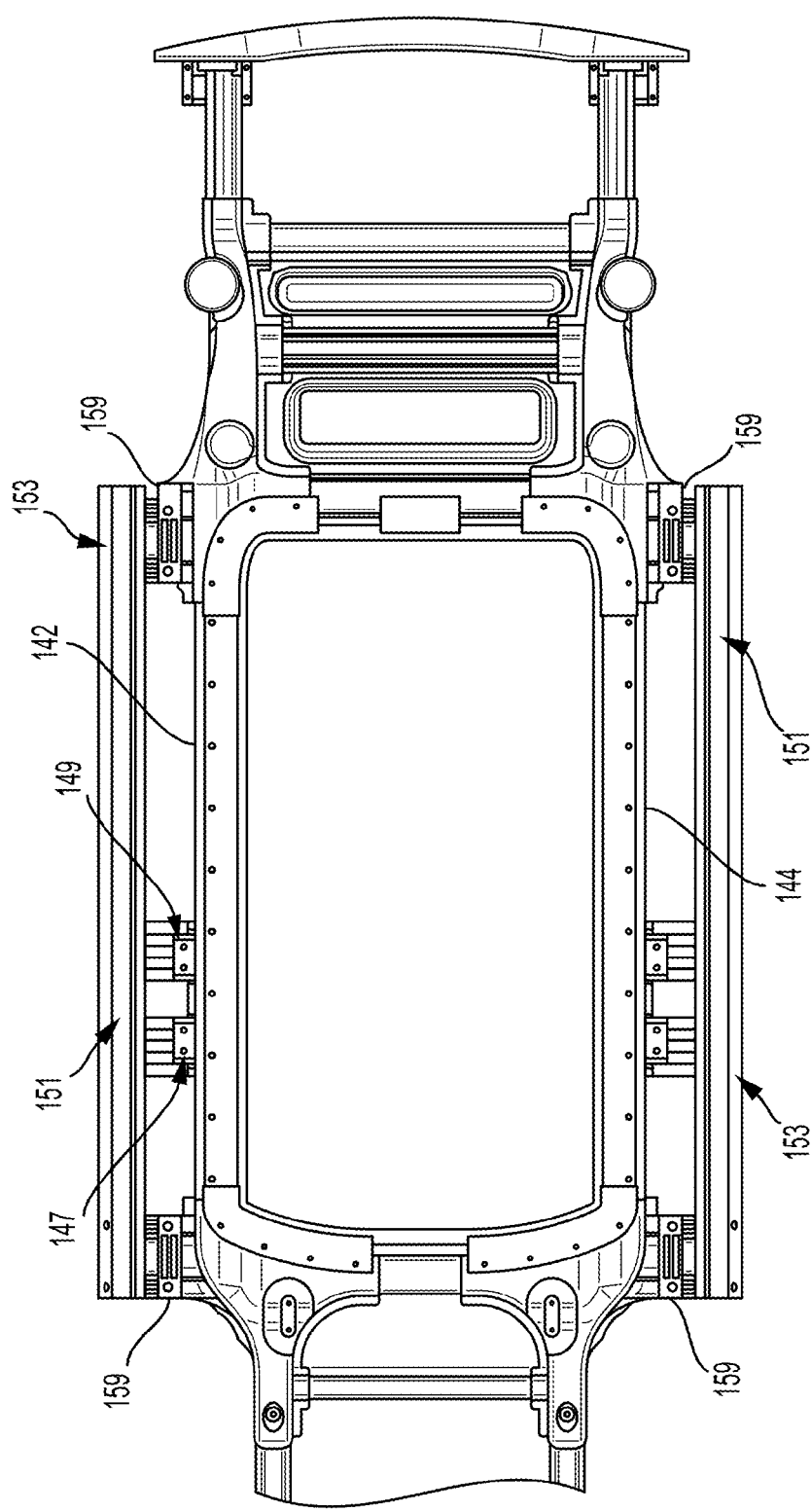
FIG. 7 is a bottom view of the underbody structure illustrating mounting rails of an exemplary upper body attached.
Figure 13:
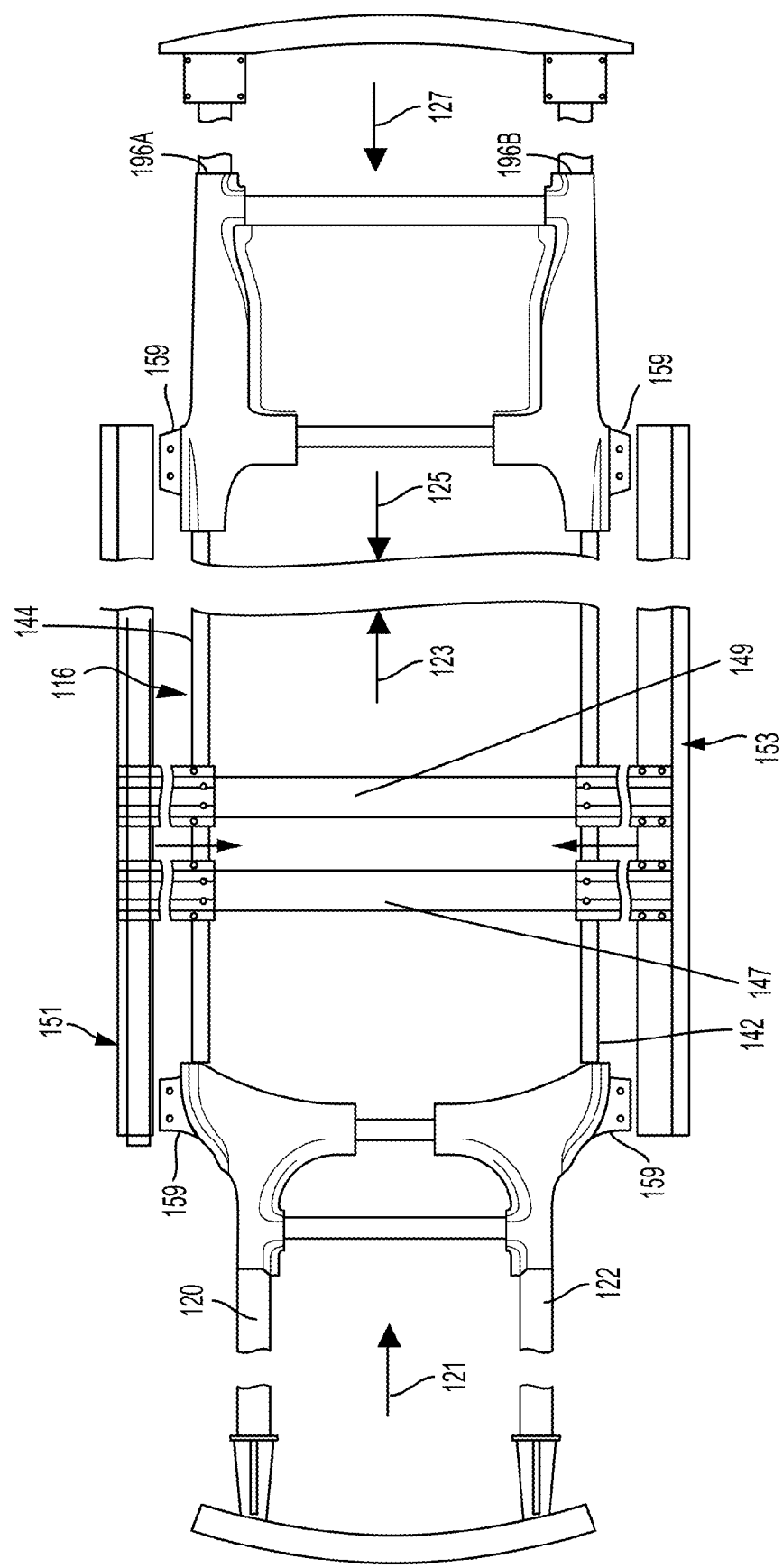
FIG. 13 is a top view of the exemplary underbody structure that illustrates various size configurable portions of the underbody structure that allow the underbody structure to be configured to accommodate various sizes of upper bodies of motor vehicles (with mounting rails of an exemplary upper body, that would attach to the underbody structure, also shown in this example).

The underbody 100 can also comprise one or more support members, such as middle support members 147 and 149 (see FIG. 13). These middle support members 147 and 149 can extend between the left center frame section 142 and the right center frame section 144 and provide yet additional structural rigidity to the underbody 100. Each of the members 147, 149 can comprise mounting brackets that join the member 147, 149 to the upper body sills 153. As illustrated in FIG. 7, in some embodiments, each of the mounting brackets can comprise joints 159 that couple the middle support members 147 and 149 with upper body rails, which are described in greater detail below.

Various embodiments can provide structural stability to the underbody 100 reducing frame twisting and bending, which can occur during impact events. For example, if the underbody 100 is impacted at a the rear right corner, the impact force can apply a twisting or torque force onto the underbody 100 as the wheels on the front end 102 tend to remain in contact with the road.

Referring again to FIG. 3, disposed along the left center frame section 142 and the right center frame section 144 can be a plurality of joints 159 that allow any upper body to be coupled with the underbody 100. Examples of the joints 159, for anchoring the upper body (not shown) to the underbody 100, are also shown in FIG. 7.

Figure 8A:
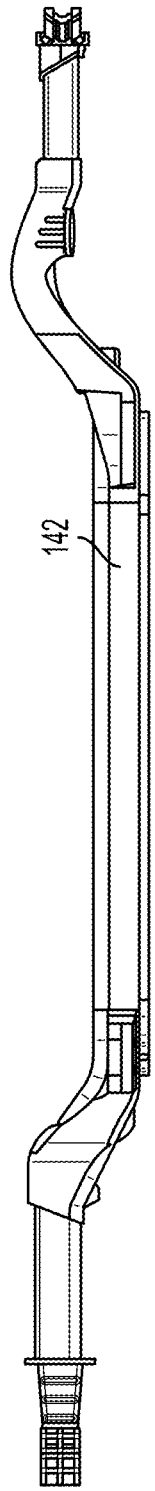
FIG. 8A is a side view of the underbody structure.
Figure 8B:
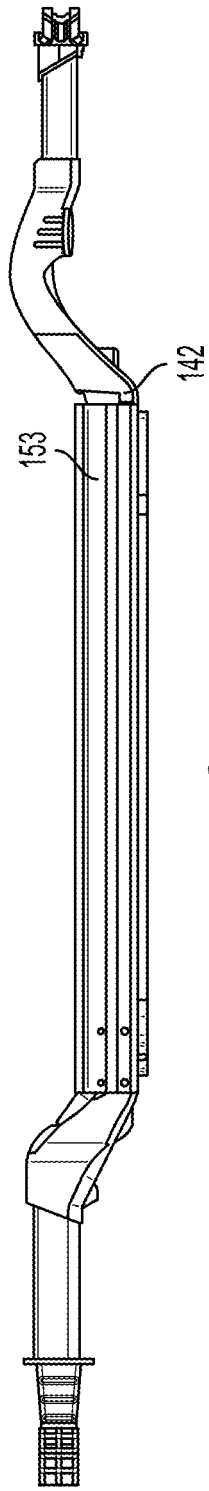
FIG. 8B is a side view of the underbody structure with exemplary upper body mounting rails attached.

In FIGS. 8A and 8B, upper body sills, such as upper body sill 153, can be joined to the left center frame section 142 and the right center frame section 144 (sections 142 illustrated in FIG. 3). For example, upper body sill 153 can be joined to right center frame section 144. The upper body sill 153 can couple the upper body (not shown) to the underbody 100 in some embodiments.

Referring back to FIG. 3, the first transition section 138 and the second transition section 140 can cooperate with the left center frame section 142 and the right center frame section 144, as well as a third transition section (node) 166 and a fourth transition section (node) 168 of the rear end 104 to form a sidewall creating a cavity for receiving a portion of the battery sub-assembly 106 therein.

An example battery sub-assembly 106 is illustrated in FIGS. 9A-C. An assembled version of the battery sub-assembly 106 is provided in FIG. 9A. A cover 172 is illustrated in combination with a body 174.

FIG. 9B illustrates the exemplary battery sub-assembly 106 with the cover 172 removed. The body 174 can be defined by a sidewall 176 that forms a cavity 178 with a lower portion 180 of the body 174. The sidewall 176 can include corner braces 175A-D, which can be manufactured using a casting process, whereas the remainder of the sidewall 176 can be manufactured from extruded metal sections.

Extending between left and right sections of the sidewall 176 can be support ribs, such as support rib 182. The support ribs 182 can lie transversely across the lower portion 180. In some embodiments, the body 174 can be provided with a flange or step 184 that allows the battery sub-assembly 106 to be coupled with the outer peripheral frame (see for example FIGS. 3 and 7). Thus, the battery sub-assembly 106 can be installed into the opening of the outer peripheral frame (see for example FIGS. 3 and 7).

The cover 172 of the battery sub-assembly 106 can also be provided with support ribs such as support rib 186. These support ribs 186 can form seals sealing the individual battery strings from each other when positioned against the support ribs 182 of the lower portion 180 of the body 174. Optionally, the support ribs 186 can also provide structural support to the cover 172.

In some embodiments, the support ribs 182 of the body 174 and the support ribs 186 of the cover 172 can cooperate to form battery channels, such as battery channel 188. The battery channel 188 can be configured to receive a battery cell stack which may be a stack or string of individual battery modules, as will be described in greater detail below.

Turning now to FIG. 10, a battery pack 190 can include an array of battery strings or segments, such as battery cell stack 192 (also referred to as battery cell string or battery string). The battery cell stack 192 can include a string of battery modules (see exemplary module in FIG. 11).

It will be understood that the size of the battery pack 190 can be selectively controlled by removing or adding battery segments 192. As the size of the battery 190 changes, the configuration of the underbody 100 can change. For example, the lengths of the left center frame section 142 and the right center frame section 144 can be lengthened or shortened according to design requirements. The arrow 195 illustrated in FIG. 10 references the removal of a battery cell stack 192 to compress the size of the battery pack 190. Arrows 191 and 193 reference the removal of a battery channel 178 to compress the size of the body of the battery sub-assembly accordingly.

Figure 11:
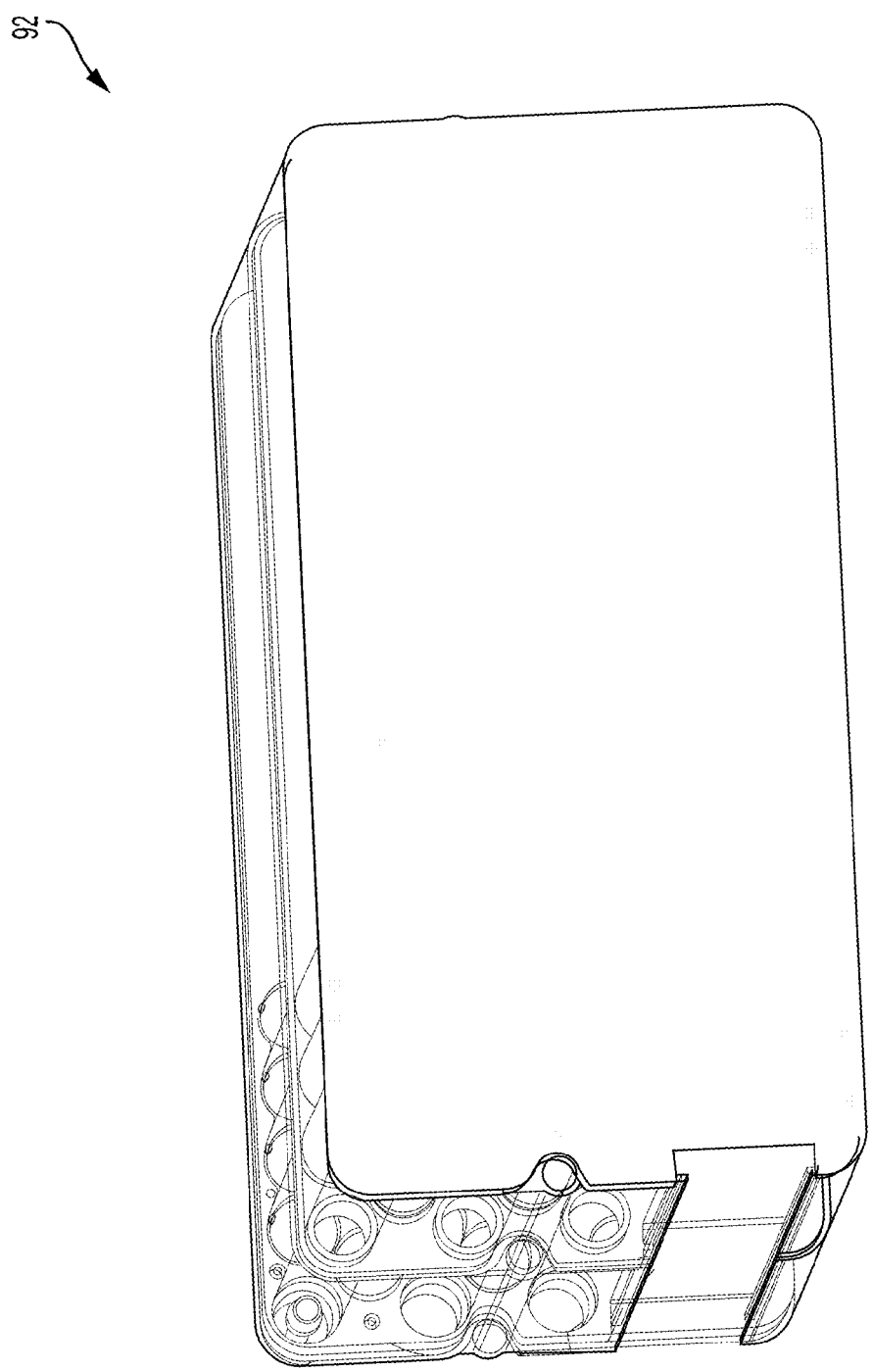
FIG. 11 is a perspective view of a portion of an exemplary battery module.

FIG. 11 illustrates a module 92 of the exemplary battery cell stack 192 (see FIG. 10).

Figure 12:
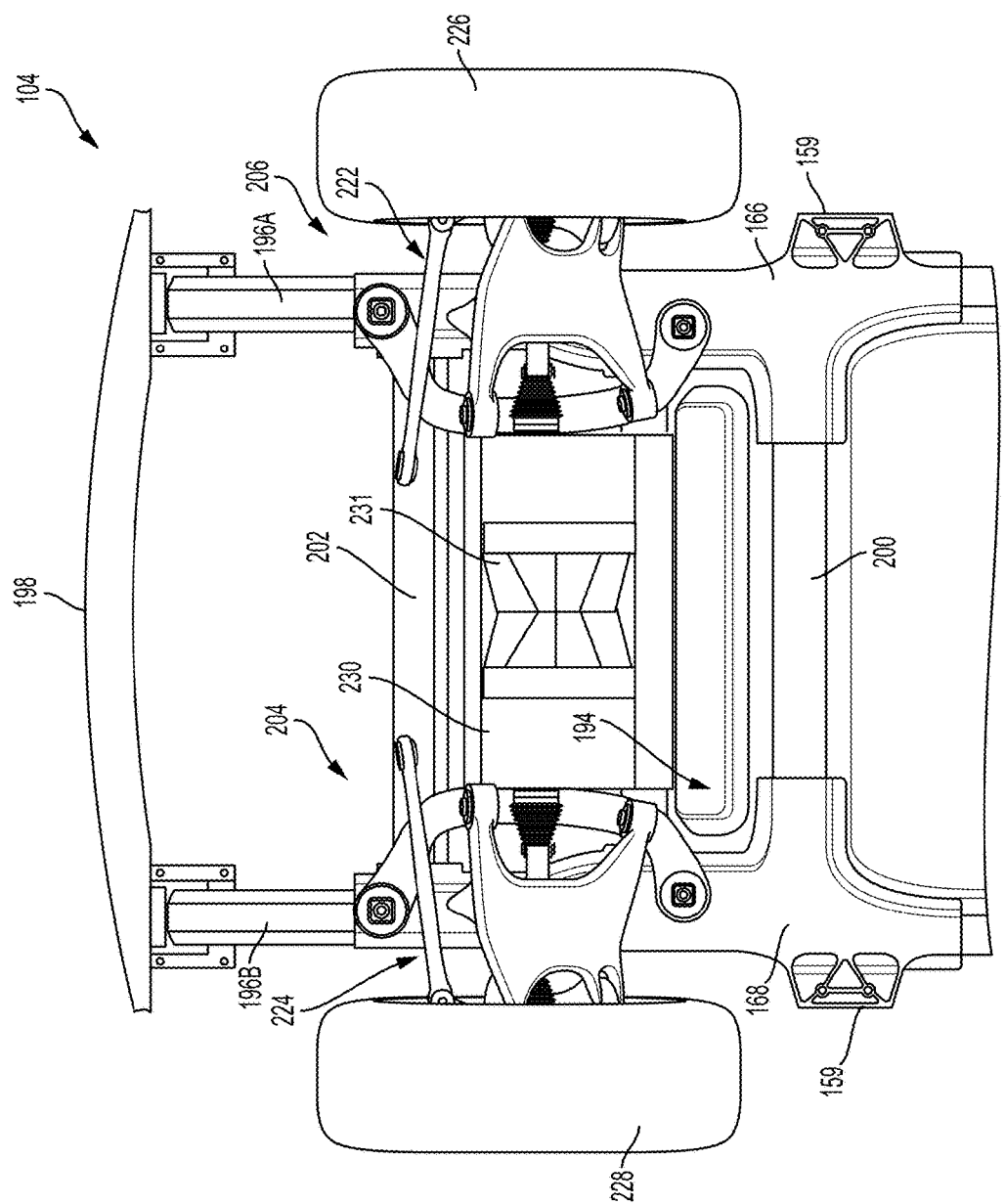
FIG. 12 is a bottom view of a rear end of the exemplary underbody structure.

Referring now to FIGS. 3 and 12 collectively, the rear end 104 of the underbody 100 is illustrated as comprising a rear structural panel 194, the third transition section 166, the fourth transition section 168, as well as a pair of rear bumper rails 196A and 196B, and a rear bumper 198.

The rear structural panel 194 can be manufactured from an aluminum foam sandwich material or a rolled panel of metal. The rear structural panel 194 can be bounded by the third transition section 166 and the fourth transition section 168, as well as a first rear cross member 200 and a second rear cross member 202. FIG. 12 illustrates an upward view of the bottom of the rear end 104, which illustrates the rear structural panel 194, which can be configured to accommodate a rear drive assembly 204. Additional details regarding rear and front drive assemblies 204 and 206 will be described with reference to FIGS. 6 and 12 in greater detail below.

The rear bumper rails 196A and 196B can be constructed similarly to the first and second rails 120 and 122 of the front end 102 and cooperatively engage the rear bumper 198. The rear bumper 198 can comprise an arcuate configuration and can be tubular in its cross section, similarly to the front bumper 118 of the front end 102.

FIG. 13 is a top plan view illustrating various features of an exemplary adaptable platform that includes an exemplary underbody structure that can be selectively adjusted in size to accommodate upper bodies of differing sizes. In addition to showing an exemplary underbody 100, FIG. 13 also shows sills 151 and 153 which are part of an exemplary upper body. The adaptable platform can provide adaptability of the underbody 100 for use in the assembly of multiple vehicle product lines. The adaptable platform (also referred as a "skateboard" platform) can accommodate vehicles of various sizes having various upper bodies. The length of the adaptable platform can vary by increasing or reducing the length of certain structures between the front rail and the rear rail, as illustrated by arrows 121, 123, 125, and 127 in the example in FIG. 13. For example, the first and second rails 120 and 122 can be selectively lengthened or shortened, as well as the rear bumper rails 196A and 196B. The size of the middle section 116 of the underbody 100 can be shortened or lengthened as needed. In some embodiments, the width of the adaptable platform can vary by increasing or reducing the width of certain structures. The size of the battery sub-assembly 106 may be changed, along with other underbody structures for accommodating different motor vehicle sizes and different vehicle upper bodies. The change in size to the battery sub-assembly 106 may require removing or adding one or more battery channels, such as battery channel 188 of FIGS. 9A-C, and corresponding change in the configuration of the battery pack 190. To be sure, these components can be sized independently from one another depending on design requirements.

Turning back to FIG. 6, the front end 102 can be configured to receive the front drive assembly, which in some embodiments can include a subframe 208 that can be mechanically coupled to the first and second rails 120 and 122, as well as the first and second transition sections 138 and 140, respectively. Wheels 210 and 212 can be supported on the front end 102 with a suspension assembly that comprises suspension sub-assembly 214 and 216, which couple wheels 210 and 212, respectively to the underbody 100. In the example in FIG. 6, the wheels 210 and 212 of the vehicle can be coupled to a front power plant 218 that can comprise an electric motor 220.

FIG. 12 illustrates the rear drive assembly 204 comprising a rear suspension assembly having rear suspension sub-assemblies 222 and 224, which are coupled to the wheels 226 and 228, respectively, with the underbody 100. The rear drive assembly 204 can comprise a rear power plant 230, which can also comprise one or more electric motors 231.

Figure 14:
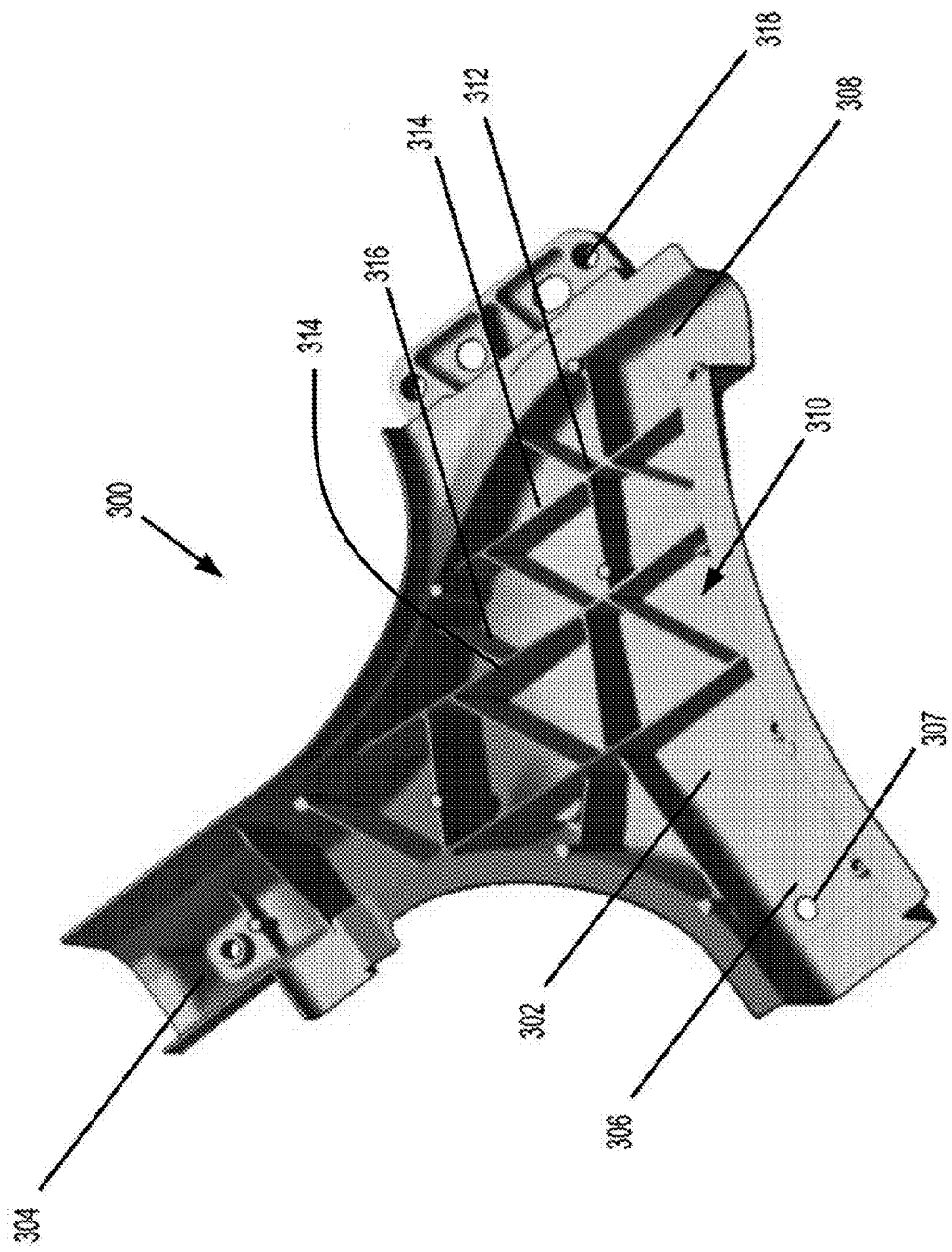
FIG. 14 is a perspective view of an exemplary webbing device for use with vehicle underbodies.

According to some embodiments, the underbody 100 can comprise a webbing device 300, as illustrated in FIG. 14. The webbing device 300 can comprise a body panel 302 shaped to comprise a front end rail channel 304, a front cross member channel 306, and a center frame section channel 308. In various embodiments, the cross member channel 306 can be oriented essentially perpendicular to the center frame section channel 308, and the front end rail channel 304 can be oriented essentially parallel and non-collinear to the center frame section channel 308. The webbing device 300 can be manufactured from aluminum or an aluminum alloy in some embodiments, but any structurally strong material could be used including steel, titanium, composite materials, thermoplastic polymers, carbon fiber, as well as from other materials that would be deemed suitable to one of ordinary skill in the art with the present disclosure before them.

The webbing device 300 can be manufactured as a single piece (or multiple pieces) using die casting, injection molding, hydroforming, extrusion, welding, or other well-known methods of manufacturing a structural material. In some embodiments, these formed, webbing devices 300 can be integrated into vehicle underbodies that distribute load vectors away from crash points. Stated otherwise, the webbing device 300, according to various embodiments, is designed to directionally distribute force loads from impacts along vectors that minimize damage to both the passenger cabin and the battery. The webbing device 300 can provide both structural strength and force load transfer in order to allow a light weight element to provide the same strength as a solid and much heavier piece.

Each of the front end rail channel 304, the front cross member channel 306, and the center frame section channel 308 can comprise one or more anchor points such as anchor point 307 that can allow the webbing device 300 to be secured to various components of the underbody 100.

In various embodiments, the webbing device 300 can be formed so as to create a recess 310. Support webbing 312 can be disposed within the recess 310 to provide a predetermined amount of structural rigidity (e.g., crush resistance). In some embodiments, the support webbing 312 comprises ribs such as rib 314 that extend linearly in rows. The rows of ribs 314 may be parallel to one another. Members, such as member 316 can extend between the ribs 314 and can be oriented non-perpendicular to the ribs 314. The ribs 314 and the members 316 may at least partially form the mounting channels 304, 306, 308 for other structural components of the underbody 100. The front end rail channel 304 can be at least partially formed from at least one member 316. The front cross member channel 306 can be at least partially formed from at least one rib 314. The center frame section channel 308 can be at least partially formed from at least one of the ribs 314 and at least one of the members 316.

In some embodiments, the members 316 can be arranged to form triangular cavities or cells. The exact shape and dimensions of the cells can be selectively adjusted based on design requirements, such as desired stiffness, desired load vectors, and crumple force.

In some embodiments, the crumple resistance of the webbing device 300 can be selectively adjusted by adjusting a space between the rows of ribs 314 and a number of the members 316 extending between the rows of ribs 314. The more closely spaced the rows and more numerous the ribs 314, the more crumple resistant the webbing device 300 can be, although additional webbing 312 components will add weight.

Some embodiments can feature designed crumple zones. Such crumple zones can be formed by selectively adjusting the spacing of the rows and/or number of ribs 314 of the support webbing 312. It will be understood, that by creating areas of greater and lesser rigidity along a chosen axis of the support webbing 312, the webbing device 300 can be designed to crumple at the area of lesser rigidity. Using similar techniques, such crumple zones may also be configured to transfer load forces along vectors directed away from the passenger and/or battery compartments.

In some embodiments, the webbing device 300 can comprise a mounting bracket (flange) 318 that can receive at least a portion of an upper body of a vehicle (not shown).

Figure 15:
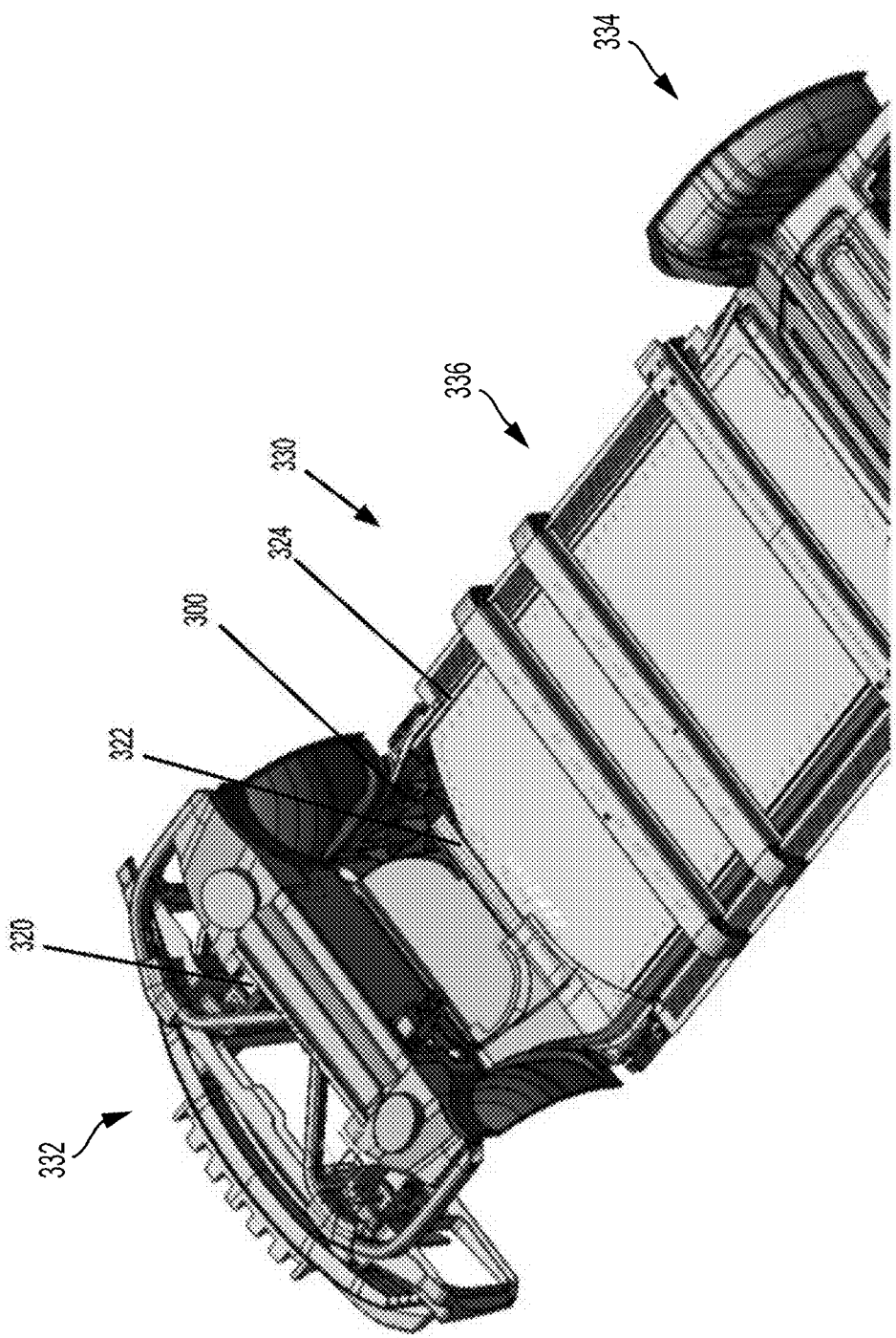
FIG. 15 is a perspective view of the exemplary webbing device in combination with an underbody of a vehicle.
Figure 16:
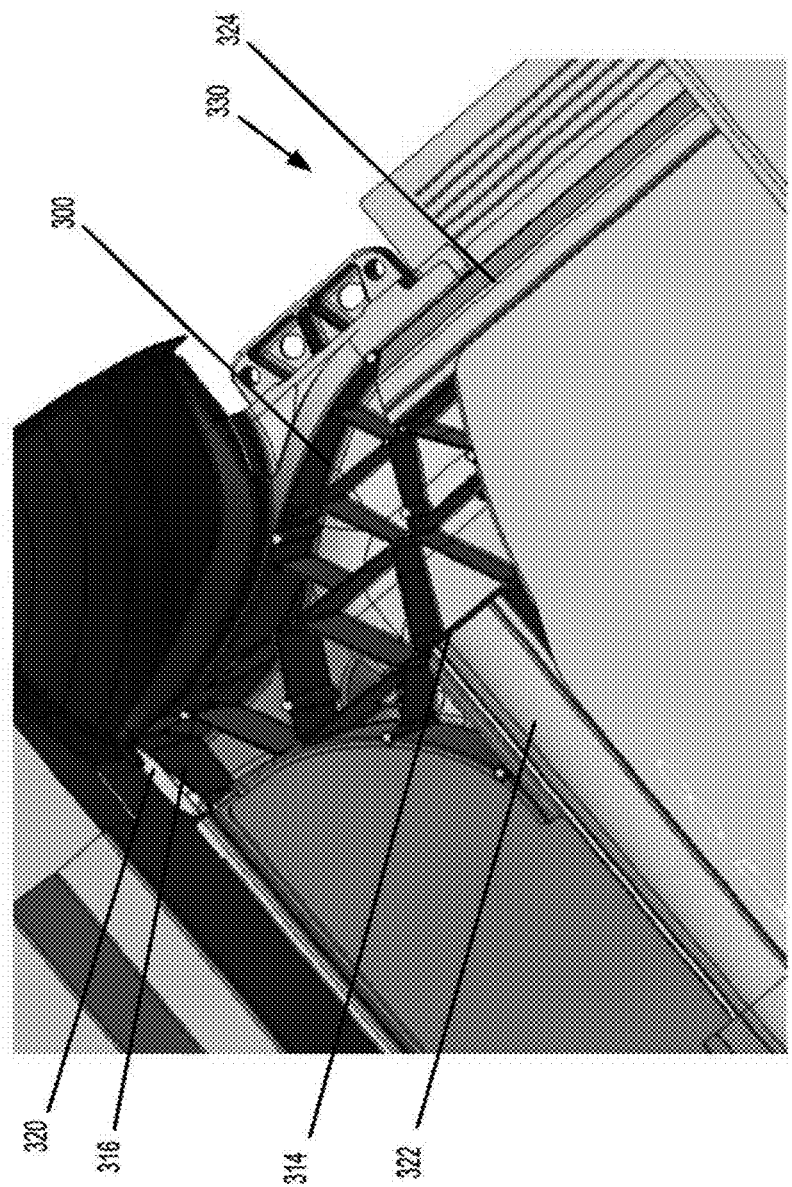
FIG. 16 is a close-up perspective view of the exemplary webbing device in combination with an underbody of a vehicle.
Figure 17:
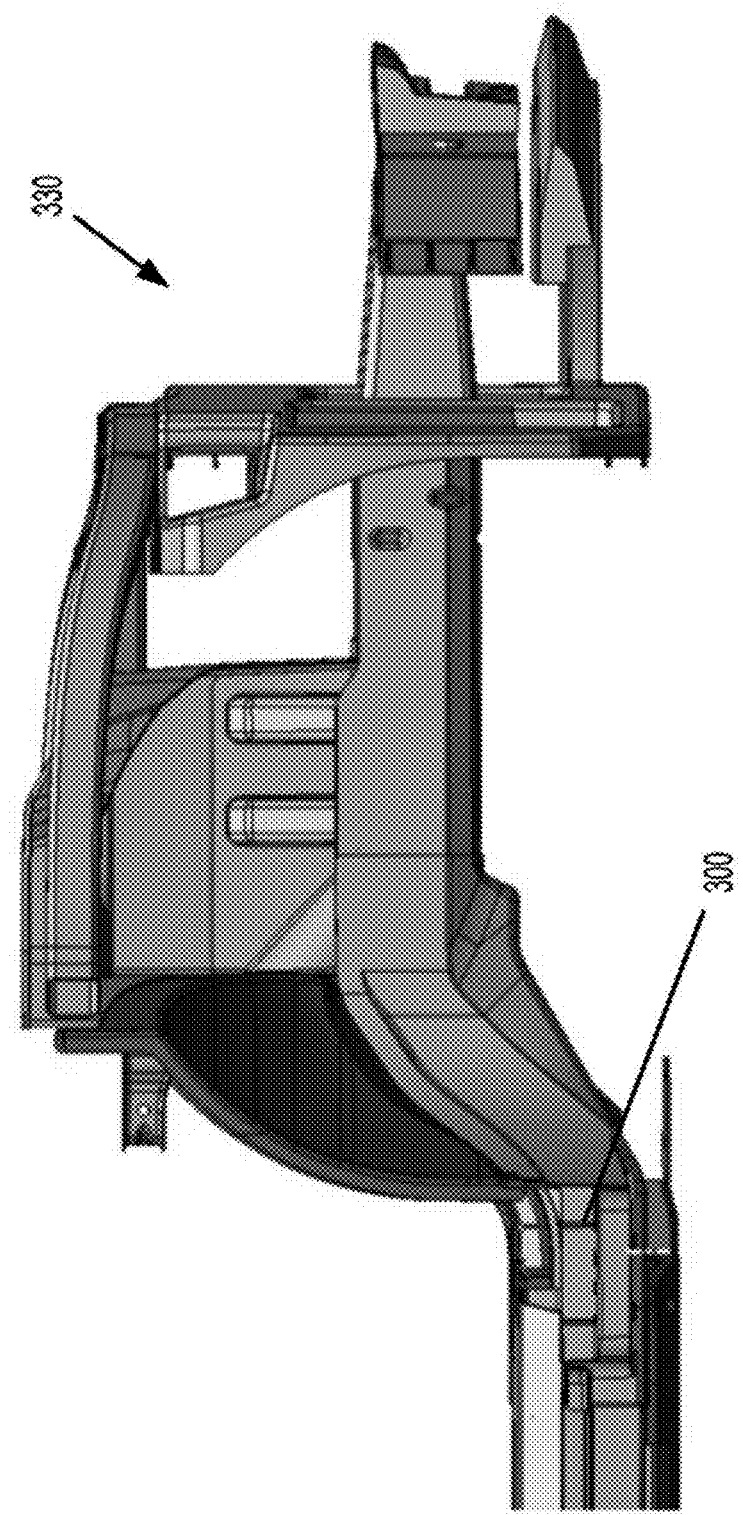
FIG. 17 is a side elevation view of the exemplary webbing device in combination with an underbody of a vehicle.

In FIGS. 15-17, advantageously, some embodiments of the webbing device 300 provide architectural flexibility for selectively adjusting a size or configuration of the vehicle. While a single webbing device 300 associated with a corner of an underbody 330 is illustrated, it will be understood that each of the four corners of the underbody 330 can each comprise a corresponding webbing device 300 such that two webbing devices 300 can be associated with a front end 332 of the underbody 330 and two webbing devices 300 can be associated with a rear end 334 of the underbody 330, and provide a transition from a central underbody section 336 to the front end 332 or the rear end 334 of the underbody 330. In some embodiments, the front end 332 and the rear end 334 pairs of webbing devices 300 can be mirror images of one another, providing for left and right handed configurations.

Referring to FIG. 15-17, in various embodiments, elements around this webbing device 300 structure, such as a front end rail 320, a front cross member 322, and a center frame section 324, can be changed to lengthen or shorten without significantly altering the structural integrity and/or crash worthiness of the vehicle. To be sure, this example webbing device 300 can function as a crumple node within the underbody 330 that can absorb and direct force loads irrespective of the size of the body structures attached to the webbing device 300. In various embodiments, the webbing device 300 can be designed to allow a variety of body shells to be mounted thereto using the flange 318.

FIGS. 16 and 17 collectively illustrate the integration, in various exemplary embodiments, of the webbing device 300 into a part of the suspension and sub-frame (referred to herein collectively as the "underbody" and identified as 330 in the examples in FIGS. 16 and 17).

In the example configuration in FIG. 16, the front cross member 322 is illustrated as abutting one of the ribs 314 of the webbing 312, the front end rail 320 abuts one of the members 316, and the center frame section 324 abuts both a rib 314 and a member 316. Additionally, as also illustrated in FIG. 3, the webbing devices 300 can orient the left center frame section 142 and the right center frame section 144 in a first plane, while orienting the front end rails 320 is a second plane different than the first plane. Similarly, the webbing devices 300 can orient the rear end rails 196A, 196B in a third plane different than the first plane. In some embodiments, the second and third planes may be the same. Referring also to FIGS. 2 and 13, the webbing devices 300 can orient the end rails 320 or 196A, 196B such that a first spaced apart distance between the end rails 320 or 196A, 196B is less than a second spaced apart distance between the left center frame rail 142 and the right center frame rail 144.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The terminology used herein is for the purpose of describing particular embodiments only and is not intended to be limiting of the present disclosure. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A connector for a vehicle underbody, comprising:
   a single-piece body panel, the body panel comprising:
      a center frame section channel;
      a cross member channel oriented essentially perpendicular to the center frame section channel;
      an end rail channel oriented essentially parallel and non-collinear to the center frame section channel; and
   a recess formed in the body panel and webbing disposed within the recess, the webbing being formed from rows of ribs and members that extend between the ribs to form cells, the webbing providing structural rigidity, crumple resistance, and force load distribution;
   the body panel providing a transition from a central underbody section to an end underbody section.

2. The connector of claim 1, wherein at least one of the structural rigidity, the crumple resistance, and the force load distribution is selectively adjustable based on space between the rows of ribs and a number of the members extending between the rows of ribs.

3. The connector of claim 1, wherein the center frame section channel is at least partially formed from at least one of the ribs and at least one of the members.

4. The connector of claim 1, wherein the cross member channel is at least partially formed from at least one of the ribs.

5. The connector of claim 1, wherein the body panel further comprises a mounting bracket that receives at least a portion of an upper body of a vehicle.

6. The connector of claim 1, wherein the rows of ribs are essentially parallel to one another and the members are non-perpendicular to the rows of ribs.

7. The connector of claim 1, wherein the ribs and members form triangular cells therebetween.

* * * * *